US006929239B1

(12) United States Patent (10) Patent No.: US 6,929,239 B1
Colin et al. (45) Date of Patent: Aug. 16, 2005

(54) MICROFLUID SYSTEM FOR REACTIONS AND TRANSFERS

(75) Inventors: Bruno Colin, Marcy l'Etoile (FR); Cécile Paris, Marcy l'Etoile (FR); Jacques Dachaud, Besancon (FR); Pierre Imbaud, Marcy l'Etoile (FR)

(73) Assignee: Bio Merieux, Marcy l'Etoile (FR)

( * ) Notice: Subject to any disclaimer, the term of this patent is extended or adjusted under 35 U.S.C. 154(b) by 0 days.

(21) Appl. No.: 09/786,617

(22) PCT Filed: Sep. 8, 1999

(86) PCT No.: PCT/FR99/02137

§ 371 (c)(1),
(2), (4) Date: May 21, 2001

(87) PCT Pub. No.: WO00/13795

PCT Pub. Date: Mar. 16, 2000

(30) Foreign Application Priority Data

Sep. 8, 1998 (FR) .................................. 98 11383
Jun. 14, 1999 (FR) .................................. 99 07689

(51) Int. Cl.[7] ............................................... F16K 1/16
(52) U.S. Cl. ...................... 251/115; 251/331; 422/103
(58) Field of Search ............................. 251/115, 331; 422/103

(56) References Cited

U.S. PATENT DOCUMENTS 40,939 A * 12/1863 Leitch ......................... 137/331
155,034 A * 9/1874 Lockwood ................... 137/331
3,613,729 A * 10/1971 Dora ........................ 137/614.18
3,680,830 A * 8/1972 An ................................ 251/86
3,881,513 A 5/1975 Chang
4,006,753 A * 2/1977 Ingram, Jr. et al. ......... 137/607

(Continued)

FOREIGN PATENT DOCUMENTS

EP 0 875 291 A2 4/1998
WO WO 97/27324 7/1997

OTHER PUBLICATIONS

Shuichi Shoji et al., "Prototype Miniature Blood Gas Analyser Fabricated on a Silicon Wafer", Sensors and Actuators, vol. 14, pp. 101-107, 1988.

*Primary Examiner*—John Fox
(74) *Attorney, Agent, or Firm*—Oliff & Berridge, PLC

(57) ABSTRACT

The invention concerns a device for performing a reaction or at least two reactions in parallel or in series, and for transferring a fluid flow, consisting of. an upper surface (2) and a lower surface (3) mutually linked by an edge (4); at least a duct (5) wherein a fluid flow (F1) can be generated by means transferring at least one sample (6) to be treated and/or analysed, and at least a valve (8) incorporated in each duct (4) for directing each sample (6) thereby controlling the transfers, reactions and analyses in the device. Each valve (8) consists of two means (9 and 10) integral with the device, the first means (9) being mobile between an inoperative position wherein the fluid transfer (6) is possible and an active position wherein said transfer cannot take place, and the second means (10) being mobile between a position wherein it is not in contact with said first means (9) and an active position wherein it deforms the first means (9) and it is activated by an actuator external to the device.

10 Claims, 7 Drawing Sheets

U.S. PATENT DOCUMENTS

| | | |
|---|---|---|
| 4,106,675 A | 8/1978 | Taylor |
| 4,585,623 A | 4/1986 | Chandler |
| 5,165,655 A | 11/1992 | Drexel et al. |
| 5,188,148 A * | 2/1993 | Garrison ................... 137/606 |
| 5,325,880 A | 7/1994 | Johnson et al. |
| 5,671,905 A | 9/1997 | Hopkins, Jr. |
| 5,771,914 A * | 6/1998 | Ling et al. ................... 137/1 |
| 5,772,181 A | 6/1998 | Robertson, III |

* cited by examiner

Section A-A

Section B-B

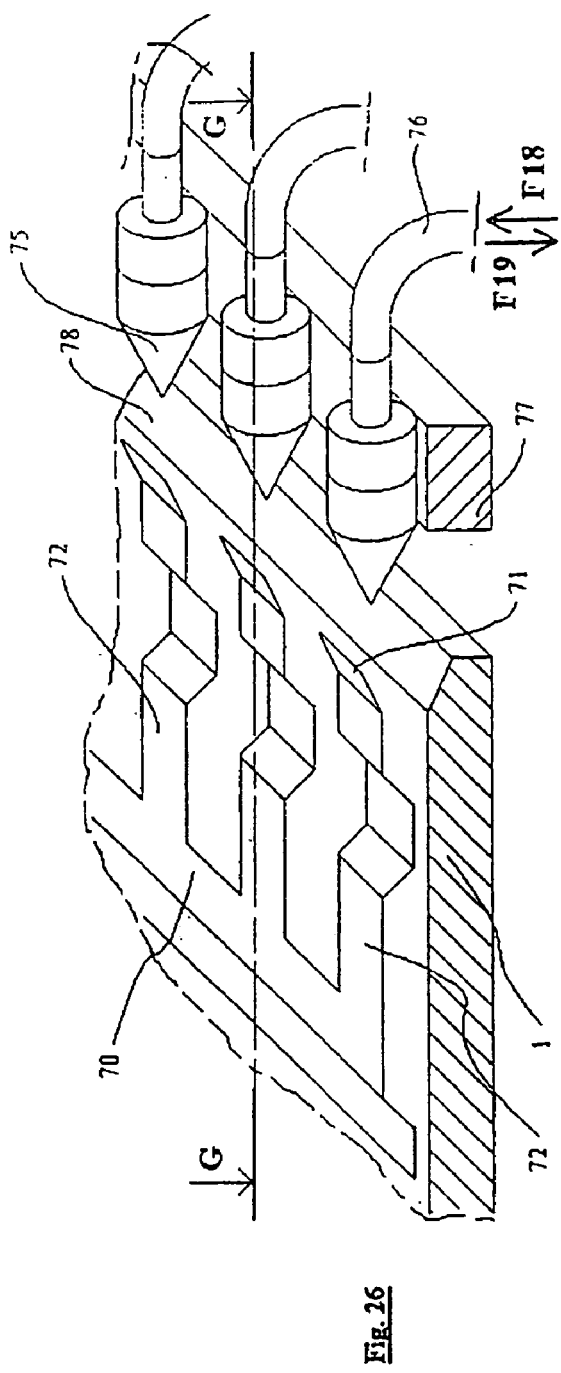
Fig. 26
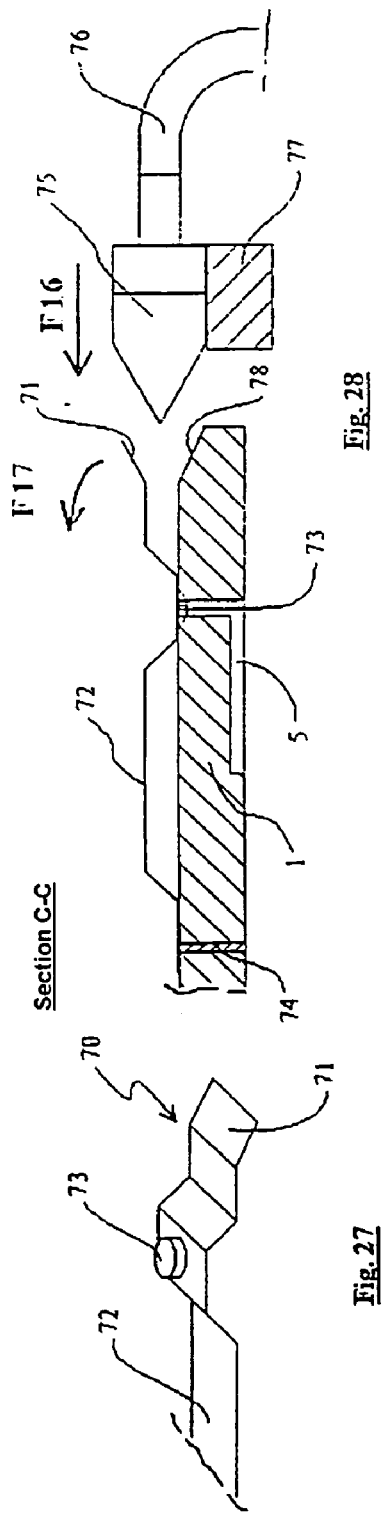
Fig. 27
Section C-C
Fig. 28

MICROFLUID SYSTEM FOR REACTIONS AND TRANSFERS

The present invention relates to a device or consumable, for example consisting of a card, making it possible to conduct a reaction or at least two reactions in parallel within it, and which consists of an upper surface and a lower surface connected by an edge. Each of the reactions, which are physically isolated from one another, takes place in at least one independent duct in which a fluid flow can be created by transfer means.

The invention also relates to a system for transferring a fluid flow between two devices on cards, and to a method for transferring such a fluid flow between two devices or cards, as described hereinabove.

The state of the art consists of document U.S. Pat. No. 4,106,675, which proposes an apparatus for sampling a liquid with a tubular cross section consisting of a flexible material through which the liquid can pass. The apparatus also has a means for controlling the liquid flow, which consists of a rigid valve positioned in the flexible tube. This tube is welded onto the control means in a downstream position and adopts the shape of said means in the upstream position. When a flow of liquid reaches the control means, it cannot continue to pass via said tube. As a result of this, the liquid builds up at the weld, allowing the flexible tube to swell upstream, thus uncovering a lateral opening of said control means through which the liquid can continue its journey.

The use of such devices entails creating a raised pressure at the control means. This makes combining several control means of this type on a single card impossible, without the collaboration of other elements for the controlled opening and/or closure of the ducts.

An object of document U.S. Pat. No. 4,585,623 is to quickly perform chemical or immunochemical tests at a single point. This apparatus comprises a body made of molded plastic which can be miniaturized, and which has several tubes containing reagents, one tube containing the sample and a smaller-sized tube accommodating the reaction. As each tube is associated with a piston, it is possible for the apparatus to be inserted in a programmable controller.

This apparatus is relatively bulky even though it can be miniaturized, because the position of said apparatus and of the various link rods which will allow the piston to be actuated has to be envisioned. In addition, it is possible to carry out just one reaction with such an apparatus; if several reactions are to be carried out, then several apparatuses will need to be envisioned, as will the time taken to load these with the appropriate reagents and samples.

Document WO-A-97/27,324 relates to a cassette for conducting reactions in parallel, which comprises an inlet opening and an outlet opening for transferring the sample or samples for introduction into the cassette. Certain zones of the cassette are of a special construction (Bursapak chamber, piston valve, ball valve), they make it possible, under the action of a continuous external force, to keep a duct closed. What is involved here are valves made of two parts; first of all there is a film with a particular shape and which can be deformed, and then there is a plunger for closing or opening the valve by deforming the film.

However, this construction has many drawbacks. The two main drawbacks lie, on the one hand, in the risks of internal contamination of the cassette, because prior to use it is stored at atmospheric pressure and, on the other hand, in the means that actuate the cassette, at the Bursapak chambers, which consist of piston valves and ball valves which are needed, in time and in intensity, to keep the ducts concerned closed. Now, these actuating means do not form an integral part of said cassette but are attached and not secured to the cassette and are therefore located in an apparatus for governing the reactions within the cassette. This contamination and/or the failure to keep said ducts closed may lead to subsequent errors in the later use of the cassette. Keeping the ducts closed in this way entails intricate and expensive apparatus which makes the cost of using such cassettes prohibitive. Finally, the very specific shape of the film leads to additional manufacturing and packaging costs.

The article by Shoji et al. "Prototype Miniature Blood gas analyser fabricated on a silicon wafer" published in SENSORS AND ACTUATORS (vol. 14, Oct. 24, 1986–Sep. 24, 1987, pages 101–7), reference XP002101654 deals with a small apparatus for calculating the pH of the blood. Essentially, this apparatus is equipped with microvalves. There are a first and a second means that make up the valve. These are a film and a glass cylinder which are secured to the apparatus. The glass cylinder is actuated by a spring made of shaped memory alloy, which has to be actuated from the outside using an electrical current.

It is therefore necessary to maintain the electrical power supply if the microvalve is to be kept in its open or closed position. With the invention of the applicant company, once the external actuator has acted upon the valve, the actuator is generally no longer needed.

Document U.S. Pat. No. 3,881,513 proposes a dispenser for dispensing liquid in numerous ducts. This dispenser contains valve seats with a ball present at each of them. This ball, associated with the frustoconical shape of the seat with which it is associated, allows or prevents the passage of a fluid in the direction of this fluid.

There is therefore no real actuator for this type of ball valve which acts rather more like a fluid version of a diode. The valve according the applicant company's invention has an actuator forming the valve, secured to the device and which either activates or does not activate closure of said valve depending on its position.

Document EP-A-0 875 291 relates to a strip containing a certain number of bowls associated in a linear fashion. Of all these bowls, the first two are the most interesting. Each chamber contains the agents useful in an amplification technique such as TMA. A duct connects the two bowls and comprises a valve. The most advantageous embodiment consists in a flexible duct comprising a valve consisting of a sealed ball. The freeing of this valve can thus be described by the action of two arms which allow the flexible duct to deform and thus allow the ball to move to a place where said duct is of a larger diameter in which the ball no longer closes said duct.

Unlike that invention, the valves in our device can be actuated a great many times, because their open or closed position is reversible.

According to the present invention, the device proposed solves all of the abovementioned problems by proposing a consumable which is reliable and inexpensive to use. Thus, the valves are entirely secured to the device and activating or deactivating them entails merely an isolated action or an action which is very limited over time, of an external actuator. What is more, these valves can be actuated a great many times.

To this end, the present invention relates to a device making it possible to conduct a reaction or at least two reactions in parallel or in series within it, and which consists of:
- an upper surface and a lower surface which are connected by an edge,
- at least one duct in which a fluid flow can be created by transfer means to allow at least one sample for treatment and/or analysis to be transferred, and
- at least one valve incorporated into each duct allowing each sample to be oriented and thus allowing control over the transfers, reactions and analyses in the device, characterized in that each valve consists of two means secured to the device, the first means being able to move between a position of rest in which transfer of fluid is possible and an active position in which said transfer is impossible, and the second means being able to move between a position of rest in which it is not in contact with said first means and an active position in which it deforms the first means so that transfer is impossible, and in that said second means is activated by an actuator external to the device.

According to a first embodiment variant, the external actuator acts only when the second means is moved from its position of rest into its active position and vice versa.

According to a second embodiment variant, the external actuator acts only when the second means is kept in its position of rest.

According to a third embodiment variant, the external actuator acts only when the second means is kept in its active position.

The first and second means are positioned at one of the surfaces of the device with which the duct in question is flush.

More specifically, the first and second means are positioned in the longitudinal continuation of the orifice of that part of the duct that lies upstream or downstream of the valve.

Furthermore, the second means can move between two positions, a first position of rest in which transfer of a fluid is possible, and a second deformed and stable position in which it compresses the first means at the duct in order to close it.

In a particularly advantageous embodiment, the first means, which can be deformed, consists of a flexible film made, for example, of elastomer, covering all or part of the upper surface or the lower surface of the device.

In an embodiment which is also particularly advantageous and suited to the previous embodiment of the first means which can be deformed, the second actuator means consists of a mobile lug having a piston for pressing on the first means, and of a beveled surface associated with a shoulder for keeping the mobile lug in the deformed position.

Whatever the embodiment, the second means is made as one piece and can be actuated from outside the device.

According to an embodiment variant, the first means, which can indirectly cause the duct to close, is associated with a ball located in the duct.

In addition, the ball is held in position in the duct by means of a clearance located in the longitudinal continuation of the orifice of that part of said duct which is situated upstream or downstream of the valve.

The ball has a diameter approximately identical to but smaller than the inside diameter of the duct, so that said ball becomes wedged in said duct when the first means is in the deformed second position in which transfer of fluid is impossible.

According to a particularly advantageous embodiment, the second means of the valve consists of two arms connected by a connecting arm which create an approximately U-shaped clip, the groove of which U-shape holds the card.

According to this embodiment, this clip comprises a means of actuating said clip.

Still according to this embodiment, said clip, which can move reversibly between two positions, a first position of rest in which transfer of a fluid is possible, and a deformed and stable second position in which it compresses the first means at the duct in order to close it, collaborates with means of positioning in its two extreme positions.

According to a last embodiment, the second means consists of at least one flexible tab fixed to the device.

According to this embodiment, each tab comprises a means for closing/opening a valve and a means for actuating said tab from its valve-closing position to its valve-opening position and vice versa.

The network of ducts is at a depression with respect to the environment in which the device is placed, which makes it possible, within said network, for at least one sample for treatment and/or analysis to be transferred through an inlet opening of the device, and each valve incorporated into said device allows each sample transferred to be oriented and therefore allows control over the reactions in the device.

As a preference, when the device comprises at least three valves, the distance separating two adjacent valves is constant and is preferably between 1 and 5 mm.

The present invention also relates to a first system for transferring a fluid flow between two devices as described hereinabove, which consists of:
- a transfer duct for each device, consisting of two portions, a large-diameter first portion which is not in contact with the outside of said device and a small-diameter second portion which is in contact with the outside,
- a ball located in the small-diameter portion of each transfer duct, and
- a tube capable of connecting the small-diameter portions of two devices.

The present invention also relates to a second system for transferring a fluid flow between two devices, as described hereinabove, which consists of:
- a through-duct for each device, consisting of two portions, a large-diameter first portion which is not in contact with the duct in contact with the outlet opening and therefore with the outside of said device, and a small-diameter second portion which is in contact with said opening and therefore with the outside,
- a ball located in the small-diameter portion of each through-duct, and
- a tube capable of connecting the small-diameter portions of two devices.

Whatever the system used, the small diameter of each transfer duct or through-duct is approximately identical to or smaller than the diameter of each ball and the outside diameter of the tube so as to seal against the outside each individual device or pair of devices associated using the transfer system.

Finally, the present invention relates to a method for transferring a fluid flow between two devices, as described, using a system as described hereinabove, which consists in:
- positioning each free end of the tube at the small-diameter second portion of the transfer duct, against the ball of each device,
- bringing the two devices closer together along the axis of said tube so that the tube moves each ball from the small-diameter second portion of said transfer duct or through-duct toward the large-diameter first portion of the duct.

The appended figures are given by way of explanatory example and are not in any way limiting. They will allow a better understanding of the invention.

FIG. 26 depicts a perspective view of an analysis card equipped with flexible blades acting as second actuating means according to yet another embodiment of the present invention.

FIG. 27 depicts a perspective view from beneath of one of the flexible blades depicted in FIG. 26.

Finally, FIG. 28 depicts a view in section on G—G of FIG. 26.

Figure 1:
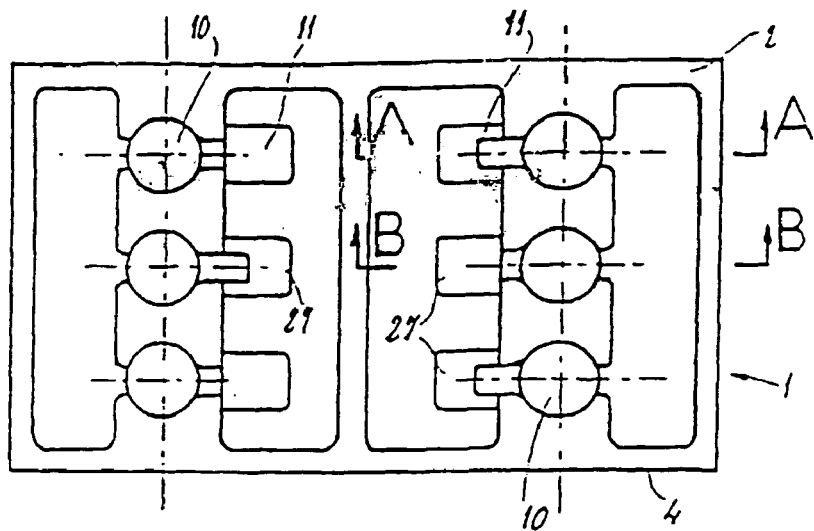
FIG. 1 depicts a view from above of a device according to the present invention.

The present invention relates to a device 1 consisting of a card 1, essentially depicted in FIG. 1. This card 1 consists of an upper surface 2, well visible in that figure, and a lower surface 3 better depicted in FIGS. 2 and 3. Between these two surfaces 2 and 3 there is an edging 4 which connects said surfaces 2 and 3. This assembly constituting the card 1 essentially consists of a body 23 in an underlying position, as is clearly visible in the sectional depictions of FIGS. 2 and 3, that is to say that the body 23 constitutes the lower surface 3 and part of the edging 4.

Said body 23 has through-holes 25 and grooves 26 running through it which together constitute a network of ducts 5. On the upper surface 2 there is an upper film 16, whereas a lower film 17 is present on the lower surface 3. Of course, this layout is not compulsory. In addition, the films 16 and 17 may be transparent or opaque, for example made of aluminum foil. Regardless of the embodiment, said films 16 and 17 are bonded or welded onto the device by any means of attachment.

The network of ducts 5 allows a sample or any fluid whether gaseous or liquid and referenced 6 in the figures to be moved along. The sample will therefore travel along the ducts 5 and, depending on whether the valves 8 or 18 incorporated into the card 1 are open or closed, will adopt one orientation or another depending on the free or open ducts offered to it.

Figure 2:
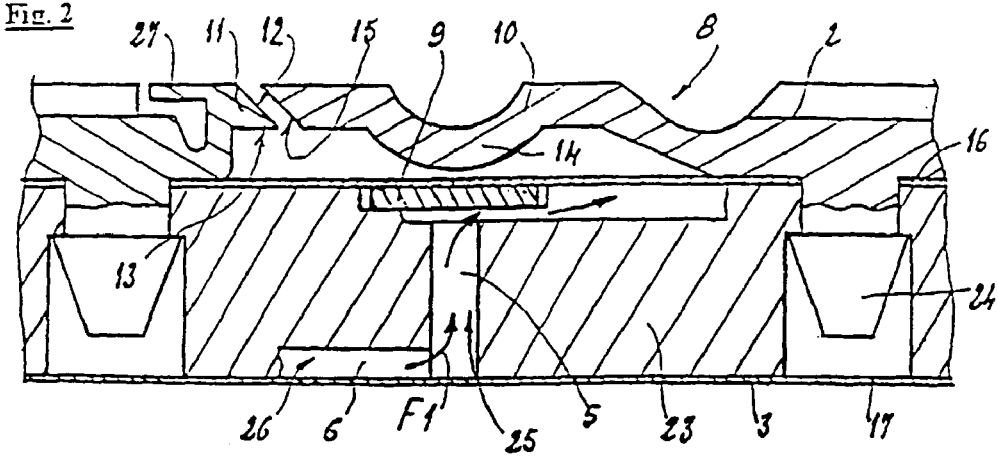
FIG. 2 depicts a view in section on A—A of FIG. 1 of a first embodiment of the invention when the first means, which can be deformed, and the second actuating means are in the position of rest in which transfer of a fluid is possible.
Figure 3:
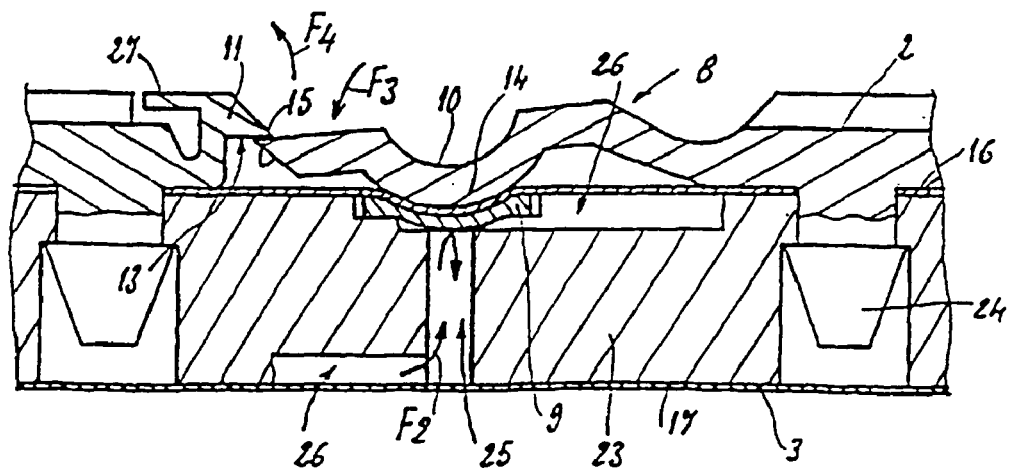
FIG. 3 depicts a view in section on B—B of FIG. 1 when the first means is in the deformed position under the action of the second means, in which transfer of the fluid is impossible.
Figure 4:
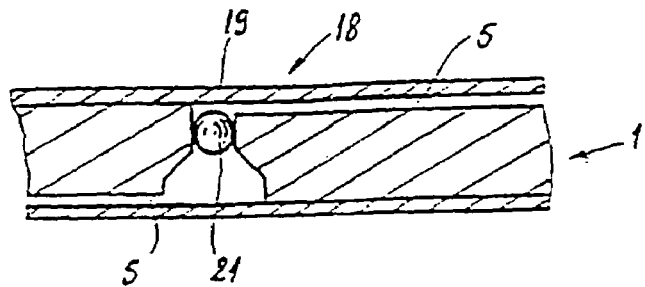
FIG. 4 depicts a view in section of a second embodiment of the invention when the first means, which can be deformed, is in the position of rest in which transfer of a fluid is impossible.

Thus, according to the embodiment of FIGS. 2 and 3, in which a valve 8 is depicted in longitudinal section, the fluid may pass the valve 8 via the duct 5, taking the path indicated by the arrows along F1 in FIG. 2. According to FIG. 3, since the valve 8 is closed, the fluid 6 will be diverted in the direction F2 and will be kept in position at the through-hole 25. Of course, the fluid 6 present in this FIG. 3 may be directed into another duct 5 whose valve 8 is open.

The valve 8 essentially consists of a one-piece element attached to the body 23 of the card 1 by attachment means 24. Said one-piece valve 8 in fact has two means.

A first means 9, which can be deformed, consists of a flexible film made, for example, of elastomer. This first means 9 may be present over all or part of the upper surface 2. Thus, the means 9 may consist of a simple elastic pellet, as is depicted in FIGS. 2 and 3.

The second means 10 acts as an actuator to actuate the first means 9. This actuator 10 also consists of two parts. First of all, located to the left in FIGS. 2 and 3, there is a mobile lug 11 which can be rocked in the direction F4. Also, collaborating with the lug 11, there is a piston 14, also mounted so that it can rock, in the direction F3. In fact, as is clearly visible in the figures, the lug 11 and the piston 14 each have a beveled surface referenced 12 and 15 respectively which, when the piston 14 is pushed in in the direction F3, allows the lug 11 to rock in the direction F4. When the piston 14 has completely evaded the beveled surface 12, said piston 14 comes to rest against a shoulder 13 of the lug 11. In this position which is depicted in FIG. 3, the valve 8 is in the position of closing the duct 5 in a stable manner without external intervention because said valve 8 is immobilized. This characteristic is entirely advantageous because it demonstrates that it is possible to have, on a single card, a certain number of valves which, once actuated by a manipulator or by a controller, allows stable closure of the valve 8.

Of course, the reverse action is entirely possible. In this case, it is necessary to act upon the tab 27 located on the lug 11 and to repeat the rocking in the direction F4 to free the piston 14, and thus open the valve 8 again. Unlike the valves of the state of the art which require external and continuous intervention as long as a closed valve is desired, this valve 8 makes it possible, once pressure has been exerted on the piston 14, for pressure no longer to have to be exerted on said valve 8 in order to keep it in the locked position.

According to this embodiment and as has already been described, the assembly consisting of the lug 11 and the piston 14 is one-piece and is attached to the body 23. Nonetheless, it is entirely possible to envision for the lug 11 and the piston 14 not to be as one piece and to both be associated separately with the rest of said card 1. Likewise, it is entirely possible for the lug 11 and the piston 14 to be of one piece with the rest of the body 23.

The benefit of having an upper film 16 and/or a lower film 17 which is/are flexible in order to collaborate with and follow the depression due to the piston 14 of the first means 9 which can be deformed will thus be fully appreciated. Nonetheless, it is entirely conceivable for the single film to be flexible and capable on its own of creating the necessary sealing of the valve 8. In this case, the first means 9 may consist of the upper film 16.

According to a second embodiment depicted in FIGS. 4 to 7, the valve 18 can operate in a slightly different way. Hence, the ducts 5 still consist of the through-holes 25 and of the grooves 26. In this particular embodiment, the through-hole 25 is of frustoconical shape over part of its length. This frustoconical shape acts as a clearance 22 for a ball 21 located within it.

In the embodiment depicted in the figures, the clearance 22 thus has a bigger diameter and a smaller diameter because of its frustoconical shape. The small diameter is in fact approximately identical to or smaller than the outside diameter of the ball 21. As a result of this and as can be seen clearly in FIG. 4, the ball 21 can mate with the shape of the small-diameter part of the duct 5. In this position, the duct 5 is plugged and the fluid 6 cannot pass.

Figure 14:
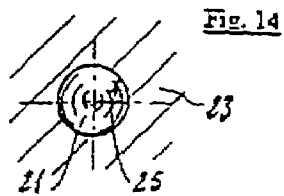
FIG. 14 depicts a view in section on C—C of the valve shown in FIG. 12.

If the diameter of the ball 21 is slightly greater, the material of which the body 23 of the card 1 is made is a material which deforms under the pressure of said ball 21 and makes a seal, that is to say that the ball 21 is held in a stable position in a circular duct by gripping around its entire circumference, FIG. 14.

Figure 12:
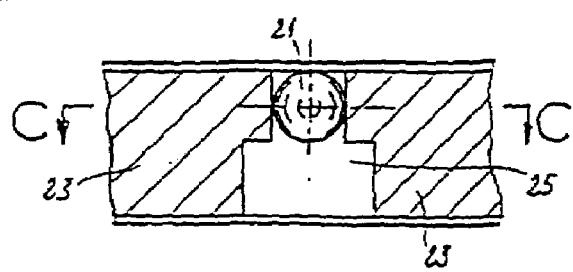
FIG. 12 is a schematic view of a valve in the closed position.

This situation defines the "valve closed" position, FIG. 12.

Figure 6:
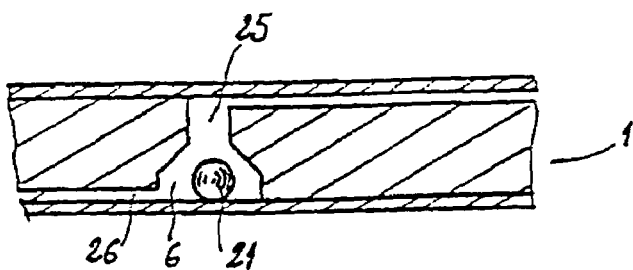
FIG. 6 depicts a view in section identical to FIGS. 4 and 5 when the first means, which can be deformed, and the second actuating means are in the position of rest in which transfer of a fluid is possible.

In order to unlock the situation and open the valve 18, the latter 18 comprises, just like the previous valve 8, a first means 19 which can be deformed and which in the figures consists of a flexible upper film. At the through-hole 25 in which the ball 21 is present, a second means 20 of the valve 18, which acts as an actuator, acts, on the one hand, in the direction F5 on the first means 19 and, on the other hand, allows the ball 21 to be removed into the space of the duct 5 which has a larger diameter. As a result of this and as depicted in FIG. 6, it will be possible for the fluid 6 to pass along the duct 5.

Figure 15:
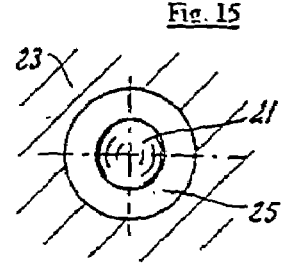
FIG. 15 depicts a view in section on D—D of the value shown in FIG. 13.
Figure 16:
FIG. 16 depicts a view in section identical to that of FIG. 15 according to a second embodiment.

In fact, the ball 21 is moved axially into a larger-diameter housing, FIG. 15, or into a housing of the same diameter but without clearances 22, FIG. 16. The clearance between duct 5 and ball 21 is then great enough to allow fluid 6 to pass.

Figure 13:
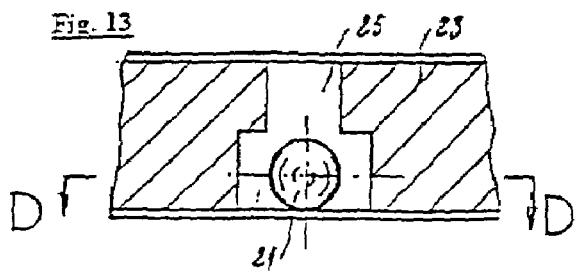
FIG. 13 is a schematic view of a valve in the open position.

This situation defines the "valve open" position, FIG. 13.

Figure 5:
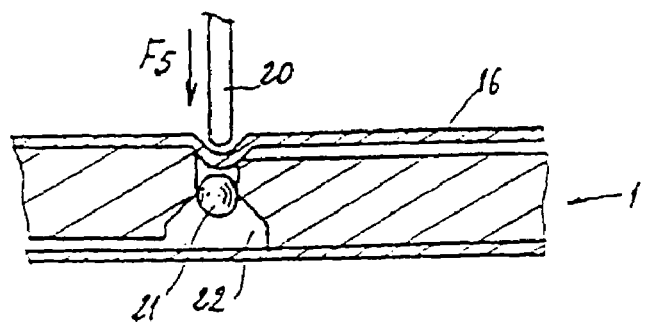
FIG. 5 depicts a view in section identical to FIG. 4 when the first means is in the partially deformed position under the action of the second means, in which transfer of the fluid remains impossible.
Figure 7:
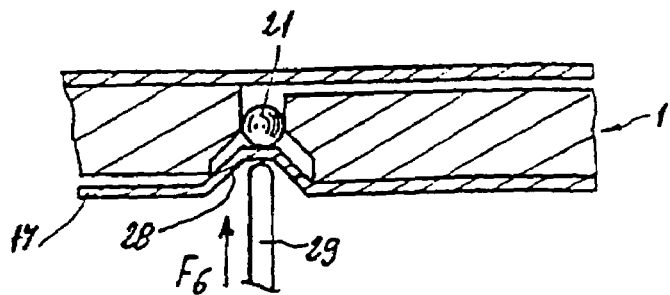
FIG. 7 depicts a view in section identical to FIGS. 4 and 6 when a third means is in the deformed position under the action of the first means, in which the transfer of the fluid becomes impossible again. Note that the first and third means, on the one hand, and the second and fourth means, on the other hand, are technical equivalents.

To allow the reverse movement, that is to say the movement of closing the valve 18, as is depicted in FIG. 7, it is possible to have a mechanism identical to the one depicted in FIG. 5. Nonetheless, this is used on the other side of said card 1. This movement of the ball 21 is achieved by tooling external or not external to the card, via the flexibility of the upper film 7 which constitutes a third means 28 that can be deformed. This third means 28 collaborates with a fourth means 29 which acts as an actuator, in the direction F6, and which allows the ball 21 to be positioned once more in the duct 5, at its small-sized diameter. This re-closes said valve 18 as was depicted in FIG. 4.

Three other embodiments of the second means constituting a valve and capable of deforming a flexible film 39 of a structure similar to the one reference 16 or 17 beforehand are depicted in FIGS. 18 to 25. These three embodiments all consist of clips.

Figure 18:
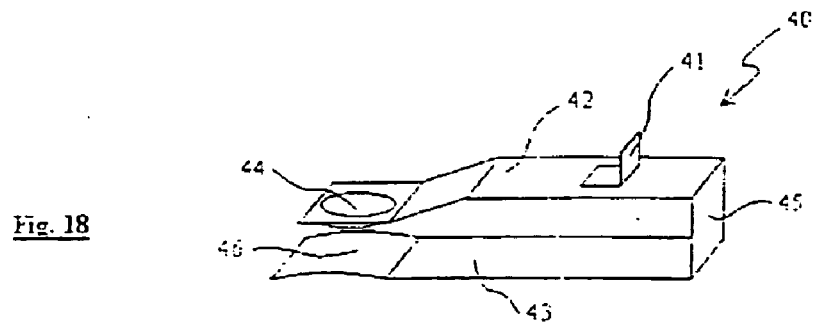
FIG. 18 depicts a perspective view of a clip acting as a second actuating means according to another embodiment of the present invention.

According to the first embodiment depicted in FIG. 18, this second means 40 consists of a clip which acts as an actuator. This clip 40 essentially consists of two arms roughly parallel to one another, a first arm 42 in an upper position and a second arm 43 in a lower position in this figure. The two arms 42 and 43 are connected at one of their ends, to one another, by a connecting arm 45 which is roughly perpendicular to the aforementioned two arms 42 and 43. The free and terminal end of the two arms 42 and 43 is particularly suited to holding the clip 40 in position on the card 1, because the first arm 42 has a piston 44 and the second arm 43 has a pressing boss 46. The distance separating the piston 44 from the boss 46 is smaller than the distance separating the two arms 42 and 43 at the connecting arm 45.

As can be noted in FIGS. 19 to 23, the clips 40 hold the card 1 within them. As a result, the width of this card 1 is greater than the separation between the piston 44 and the pressing boss 46 but less than the distance separating the two arms 42 and 43 at the connecting arm 45. The clip is therefore held in position by the elasticity of the material of which said clip 40 is made, it being possible for such a material to be a metal or a plastic.

Figure 20:
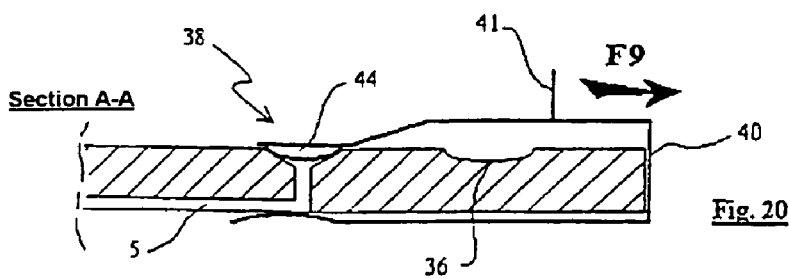
FIG. 20 depicts a view in section on E—E of FIG. 19, in which the clip is closing the valve.
Figure 21:
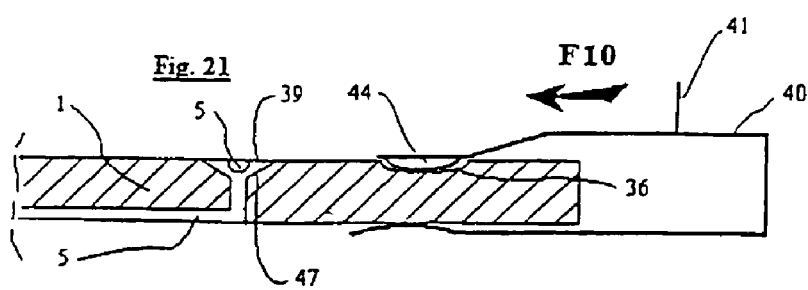
FIG. 21 is identical to FIG. 20, but the clip is leaving the valve open.

In FIGS. 20 and 21, the clip 40 can move between two positions, an active position in which the piston 44 closes the valve 38 as depicted in FIG. 20, and a position of rest in which the clip does not act on said valve 38. It is possible to switch from the active position to the position of rest in the direction F9 of FIG. 20, and from the position of rest to the active position in the direction F10 of FIG. 21. To do this, the first arm 42 has a small U-shaped cut and the internal part of this cut is folded back to form an actuating lug 41 which has a position roughly perpendicular to the plane formed by the first arm 42. This lug 41 will be able to collaborate with actuating means known to anybody skilled in the art such as electromagnets or cam and linkage systems for example, making it possible to obtain a back-and-forth movement in the directions F9 and F10.

If reference is now made to FIGS. 20 and 21 alone, the way in which the valve 38 works will be understood better. This valve 38 consists of a duct 5 which passes through the card 1 but the shape of which is flared and constitutes a seat 47 for said valve 38 on the upper part of the card 1, in the depiction thereof given in the figures. At this seat 47 there is another longitudinal duct 5, in a position perpendicular to the previous duct 5, only the semicircular shape of which can be seen in FIG. 21. When the piston 44 compresses the flexible film 39 at the seat 47, it will be easily understood that the piston 44 prevents any transfer of fluid 6 from the ducts 5. This is also what is clearly depicted in FIG. 23 in which the fluid 6 flows readily in the direction F11 and is diverted in the direction F12 at the one and only closed valve 38, that is to say the valve located to the right in this figure. For the other positions, the clips 40 are in the open position if reference is made also to FIG. 22.

In fact, in the position of rest, the clip 40 is in an offset position with respect to the valve 38, the piston 44 will therefore adopt the shape of a semicircular groove 36 which gives said clip 40 a stable position of rest.

Figure 22:
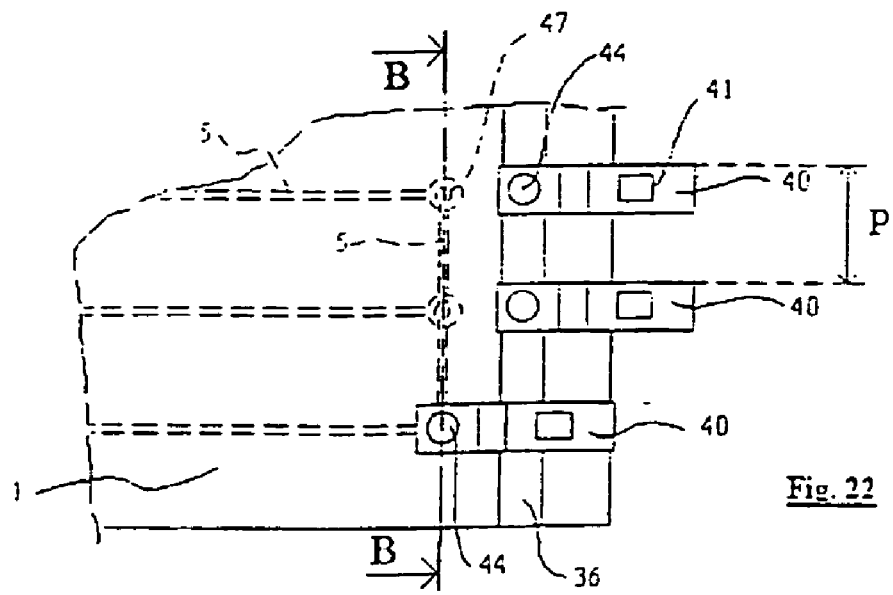
FIG. 22 depicts a view in elevation of FIG. 19, in which two of the three valves depicted are open.
Figure 23:
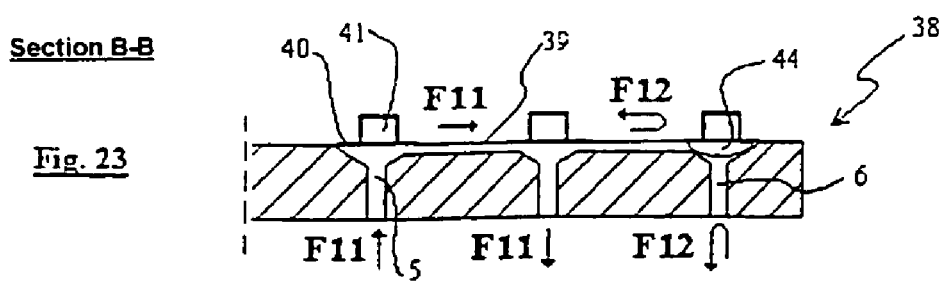
FIG. 23 depicts a view in section on F—F of FIG. 22.

In FIGS. 22 and 23 it will also be understood that there are two inlet ducts 5 located one on each side of an outlet duct 5 which is easy to visualize by looking at the arrows F11 and F12. The two lateral valves 38 make it possible to control the arrival or non-arrival of a fluid 6 contained in each of these lateral ducts 5, while the central valve 38 makes it possible to control the discharge or non-discharge of the mixture or of one of the fluids 6 which has been introduced and passes through.

Figure 19:
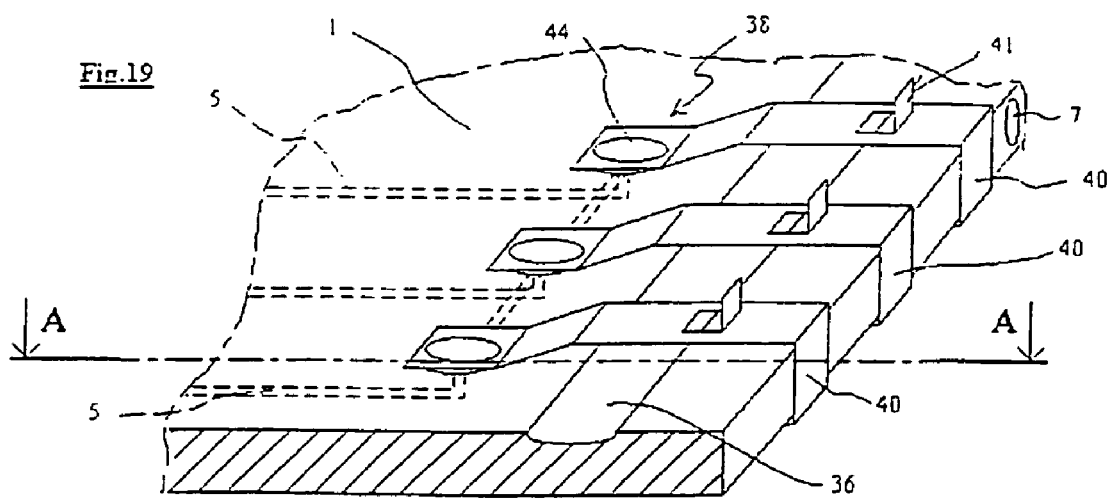
FIG. 19 depicts a perspective view of an analysis card comprising a network of ducts in which the fluids are directed via valves equipped with clips according to FIG. 18.

In FIGS. 19 and 22, the clips 40 are spaced uniformly apart. There is therefore a spacing between two adjacent clips. As a preference, this spacing can adopt values used in the field of electronics, namely 3.96 mm, 2.54 mm or 1.28 mm. The advantage of this construction lies in the fact that the actuators also have this spacing, which is a mark of reliability, competitiveness and flexibility for the analysis apparatuses thus equipped. In addition, the clips may advantageously be guided in a groove formed on the lower surface of the card, thus guaranteeing precise relative positioning of the duct (5) and the piston (44).

Figure 24:
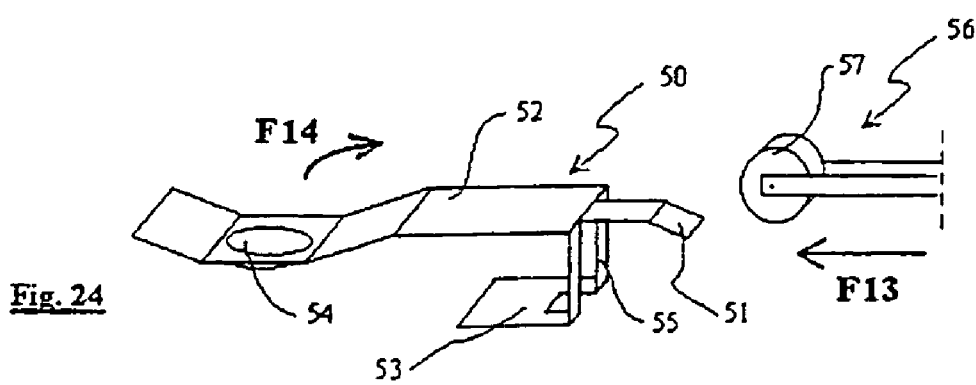
FIG. 24 depicts a perspective view of a clip according to a second embodiment of the invention, and of an actuator designed for this clip.
Figure 25:
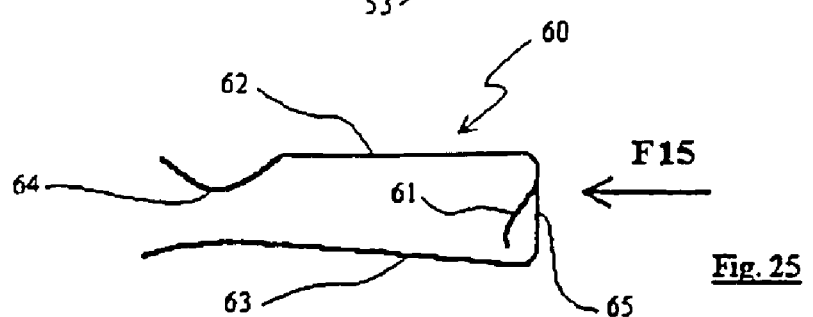
FIG. 25 depicts a side view of a clip according to a third embodiment of said invention.

FIGS. 24 and 25 show two other embodiments of a clip similar to the clip 40.

According to FIG. 24, a clip 50 comprises two arms which are parallel to one another, a first arm 52 and a second arm 53. Nonetheless, and in contrast to the previous embodiment, the first arm 52 is effectively extended in the form of a piston 54 whereas the second arm is truncated. Thus, the separation between the two arms 52 and 53 in this embodiment corresponds exactly to the thickness of a card 1. The piston 54 is actuated via a beveled surface 51 which allows the first arm 52 to deform with respect to the connecting arm 55. This actuation is performed via an actuator 56 which in one particular embodiment comprises a roller 57 collaborating with the beveled surface 51. The actuator 56 is moved longitudinally in the direction F13 and this, during contact between the roller 57 and the beveled surface 51, causes rocking of the free end of the first arm 52 and therefore of the piston 54 in the direction F14.

A last embodiment of a clip 60 is shown in FIG. 25. This one is particularly simple because the clip 60 consists of two arms which are not parallel, a first arm 62 approximately perpendicular to the connecting arm 65 and a second arm 63 which is slightly convex with respect to the inside of the first arm 62. After the manner of the previous embodiments, this arm 62 has a piston 64 at its free end. It will also be noted that at the connecting arm 65 there is an elastic tag 61 for returning the clip 60 into position. This allows said clip 60 always to have a position of rest if there is no external mechanical action. By contrast, as soon as an actuator, not depicted in this figure but well known to those skilled in the art, acts in the direction F15, the tag 61, which is flexible, escapes and the entire clip 61 can be moved in the same way in the direction F15. In this embodiment, it is still necessary, when it is desired for the valve thus created to remain closed, for the actuator always to be in contact with said clip 60 in order to keep the clip in the active position. As soon as this force in the direction F15 is no longer applied to the clip 60, said tag 61 will revert to its initial position and allow said clip 60 to return to its position and thus free the ducts 5 because the piston 64 has disengaged from the valve which had been created.

Of course, these embodiments are nonlimiting and it is entirely conceivable for the rest and active positions to be reversed on the card, that is to say for it to be necessary to push in order to deactivate a valve when referring to the last embodiment.

According to one particular embodiment which is not depicted in the figures, the card 1 comprises separating partitions between the clips 40, 50 and 60, the dimensions of which may, for example, correspond to the shape of each clip 40, 50 or 60, during its movements in the directions F9 and F10. Such partitions are not depicted in these figures.

According to a last embodiment of the present invention, depicted in FIGS. 26 to 28, the second means 70 of a valve consists of a strip-like blade, said blade being made of an elastic material such as metal or plastic. This blade is continued longitudinally along the valves. At right angles to this strip-type blade there are a certain number of flexible tabs 72 which constitutes an essential element of the second means 70, the flexible tab 72 making it possible to close or open said underlying valve.

As will be clearly appreciated from the view in section on G—G of FIG. 26, that is to say in FIG. 28, the flexible tab 72 has an entirely specific shape in so much as it has two points of contact between it 72 and the card 1. First of all, to the left-hand part of this FIG. 28, there is a fixing pip 74 which connects the strip-like blade assembly to the card 1, thus forming a point at which the tabs are built in and positioned with respect to the valve passage ducts. Furthermore, there is a zone located facing a duct 5, and therefore the valve, which is also in contact with said card 1. This zone comprises a closure/opening means 73 consisting of a stud formed directly in the tab or possibly, and advantageously depending on the nature of the membrane, attached in the form of a flexible seal of the elastomer type for example. This elastomer stud 73 can act on the underlying flexible membrane fixed to one of the faces of the card 1.

Between these two zones located in contact with the card 1, the flexible and preloaded tab 72 is held away from this card 1 so as to give said tab 72 the ability to flex. In the same way, at the right-hand end of the figure, the tab 72 is extended in the form of an actuating means 71 which is in the continuation of the intermediate part described previously. Nevertheless, the free end of this actuating means 71 is raised so as to create a beveled surface 71 which will be able to collaborate with a beveled surface 78 of said card 1. Thus, the two beveled surfaces 71 and 78 face one another and create an approximately triangular geometric shape in which an actuator of the piston type 75 can be moved in translation in the direction F16 of FIG. 28. It will be readily understood that, when the piston 75 is moved in the direction F16 of FIG. 28, the entire flexible tab 72 is raised in the direction F17 and the stud 73 is no longer in contact with the flexible film located on the valve, thus allowing said valve to open.

As can be seen from FIG. 26, there are as many piston-type actuators 75 as there are flexible tabs 72. As a result, the entire set of actuators 75 is mounted on a support 77, and each piston is supplied with compressed air in the direction F18 or F19, depending on whether the air is entering or leaving the actuator 75, via a hose 76. This embodiment is particularly advantageous insofar as all the second means of the valve 70 can be constructed from a single one-piece item preformed (by molding or cutting) and possibly folded. In the same way as before, it is easy to understand the benefit that there may be in arranging both the flexible tabs 72 and the actuators 75 with a constant spacing between two adjacent tabs 72 and/or actuators 75. Compressed-air control is one embodiment amongst other known devices such as electromagnets.

To sum up, six embodiments of valves have been described and depicted in the figures.

The first embodiment of the valve 8 corresponds to FIGS. 1 to 3 in which the first means consists of the flexible film 9 and in which the second means consists of an individual flexible tab 10 acting as an actuator, carried by the card 1.

The second embodiment of the valve 18 corresponds to FIGS. 4 to 7 in which the first means consists of the flexible film 19 and in which the second means consists of an external actuator 20, the action of this actuator 20 being maintained within said valve 18 via a ball 21; this is merely indirect valve closure described and depicted in these figures.

The third embodiment of the valve 38 corresponds to FIGS. 18 to 23 in which the first means consists of the flexible film 39 and in which the second means consists of an attached clip 40, but one whose action at said valve 38 is constant according to the position of the clip 40 with respect to the device or to the card 1. This clip 40 is moved (direction F9 and F10) by an actuator not depicted in the figures, but the position of said clip 40 is stable after each intervention of this actuator.

The fourth embodiment of the valve corresponds to FIG. 24 associated with FIGS. 18 to 23, because this is a clip 50 with a second structure, the action of which is identical to the previous clip 40. This clip 50 entails the constant presence of an external actuator to be kept in the valve-open position.

The fifth embodiment of the valve corresponds to FIG. 25 associated with FIGS. 18 to 23, because it relates to a clip 60 according to a third structure, the action of which is identical to the previous clip 40. In contrast to the clip 50, the constant presence of the external actuator is to do with the valve-closed position.

The sixth embodiment of the valve corresponds to FIGS. 26 to 28 associated with FIGS. 18 to 23 because it is a clip 70 in the form of a flexible tab associated with others, according to a fourth structure, the action of which is identical to the previous clip 40.

The principle of the second valve 18 has been taken up to allow fluid 6 to pass between two devices or cards 1 of identical or different structures. Thus, it can readily be understood that any card 1, regardless of the valves 8 and/or 18 that form it, needs to have an inlet opening 7 for the fluid or sample 6. Thus, this opening 7 consists, for each card 1, of a duct 30 which has a structure approximately identical to the through-duct 25 depicted in FIGS. 4 to 7.

This duct 30 comprises a small-diameter first part located as close as possible to the opening 7, and a large-diameter second part located within said card 1. In fact, the small diameter of the duct 30 is approximately identical to or smaller than the outside diameter of a ball 31 present within it.

Figure 8:
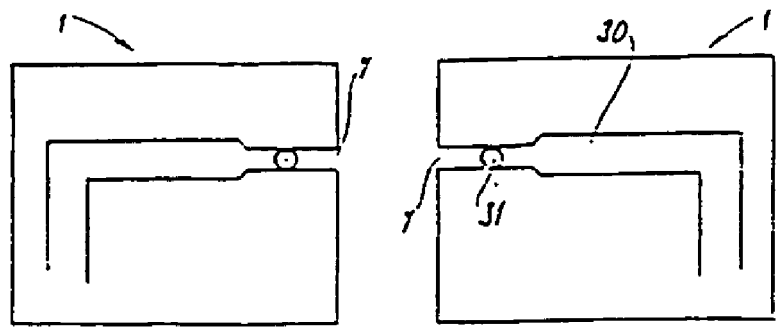
FIG. 8 is a schematic view of two devices or cards as described in the previous figures, allowing the implementation of a transfer system according to the present invention.
Figure 9:
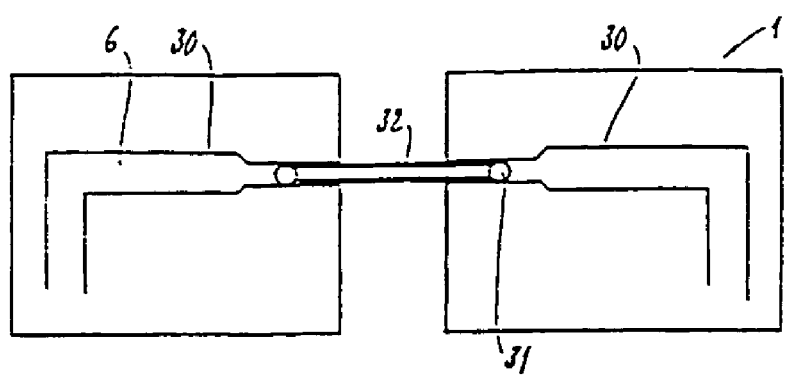
FIG. 9 depicts a view identical to FIG. 8, but in which the tube that can connect the two cards is in place.

According to FIG. 8, it will be understood that the two balls 31 will prevent fluid 6 present in one of the cards and intended to pass into the other card 1 from leaving.

Figure 10:
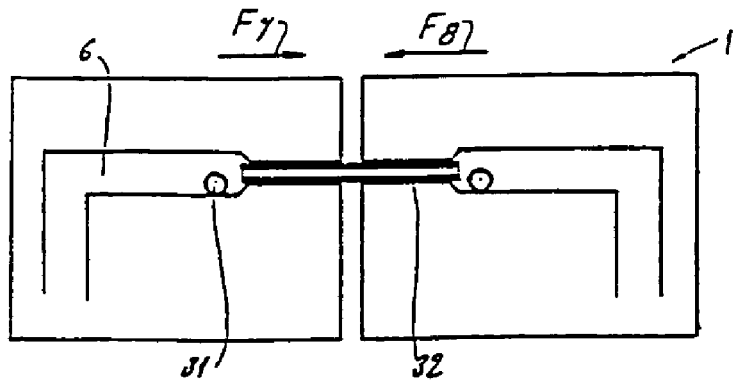
FIG. 10 depicts a view identical to FIG. 9, in which the two cards are brought closer together to allow transfer.
Figure 11:
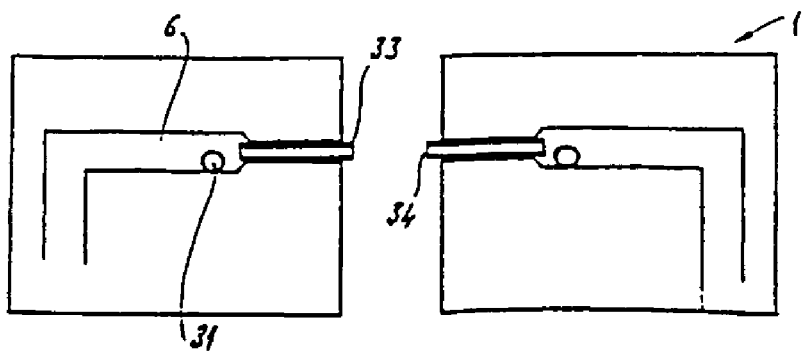
FIG. 11 is a view identical to FIGS. 9 and 10, after transfer has been performed and the two cards have been separated again.

To allow the sample 6 to be transferred, it is necessary to use a tube 32 which will push each ball 31 back out of the small-diameter duct 30 and remove each ball 31 to the large-diameter portion. In this position which is depicted in FIG. 10, the two cards 1 are brought closer together in the directions F7 and F8, and the fluid 6 can pass between the two cards 1. In this case, the inlet opening 7 of one of the two cards 1 acts as an outlet opening 7. If the passage of fluid is to be ceased, it is necessary, as depicted in FIG. 11, to use, for example, a heating means to cut the tube 32 and thus create two half-tubes 33 each of which is isolated from the outside by sealing 34 which is due to the heating of the tube 32 and for melting thereof. To do this, it is necessary to use a tube 32 made of a material that can be cut and melted with a simple source of heat.

The half-tubes 33 could be sealed using a stopper or any other means.

Of course, for each card 1, it is possible to provide a certain number of inlet openings 7 so as to allow transits with several other cards 1.

In order to understand the way in which a card 1 is filled or in which a filled card 1 passes fluid to an empty card 1, it is necessary to understand that the network of ducts 5 is at a pressure below the ambient pressure, which means that, when the network of ducts 5 is brought into contact with a sample 6 at ambient pressure, the fluid will automatically pass into said card 1.

Nonetheless, any transfer means known to those skilled in the art and suited to the particular conditions set out hereinabove may be used.

Figure 17:
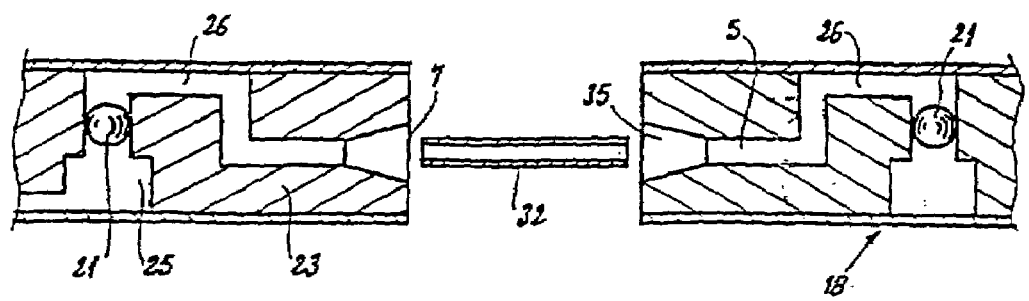
FIG. 17 depicts a view in section of a second embodiment of two devices or cards such as those described in the preceding figures, allowing implementation of a transfer system according to the present invention.

According to another embodiment depicted in FIG. 17, the transfer of liquid may be as follows. A card 1 has a valve 18 in direct connection with an inlet opening 7. This valve 18, of the ball 21 type, could consist of a valve 8 with elastomer. The inlet opening 7 has a recess in the shape of a cone frustum. There will therefore be conical coupling between the cylindrical coupling tube 32 and the sealing cone. In this embodiment, the valves 18 will be manipulated laterally with respect to the card 1.

Advantageously, said tube 32 may be inserted beforehand into one of the two cards 1.

REFERENCES

1. Device or card
2. Upper surface of the card 1
3. Lower surface of the card 1
4. Edge connecting the surfaces 2 and 3
5. Duct
6. Sample or fluid
7. Inlet or outlet opening of the card 1
8. Valve incorporated into the card 1
9. First means of the valve 8 which can be deformed or is a flexible film
10. Second means of the valve 8 which acts as an actuator
11. Mobile lug of the means 10
12. Beveled surface of the lug 11
13. Shoulder of the lug 11
14. Piston of the means 10
15. Beveled surface of the piston 14
16. Transparent upper film
17. Transparent lower film
18. Valve incorporated into the card 1
19. First means of the valve 18 which can be deformed 20. Second means of the valve 18 which acts as an actuator
21. Ball located in the duct 5
22. Clearance of the duct 5 in which the ball 21 is present
23. Body of the card 1
24. Means of attachment of the first and second means 9 and 10 to the body 23
25. Through-holes constituting the ducts 5
26. Grooves constituting the ducts 5
27. Tab of the lug 11
28. Third means of the valve 18 which can be deformed
29. Fourth means of the valve 18 which acts as an actuator
30. Transfer duct associated with the opening 7
31. Ball of the duct 30
32. Tube for connecting two ducts 30
33. Half-tube
34. Sealing
35. Cone for sealing the inlet opening 7
36. Semicircular groove
38. Valve incorporated into the card 1
39. First means of the valve 38 which can be deformed or is a flexible film
40. Second means of the valve 38 which acts as an actuator or clip
41. Lug for actuating the clip 40
42. First arm of the clip 40
43. Second arm of the clip 40
44. Piston of the clip 40
45. Connecting arm connecting the first and second arms 42 and 43
46. Pressing boss of the second arm 43
47. Seat for the valve 38
50. Second means of the valve 38 which acts as an actuator or clip
51. Lug for actuating the clip 50 or beveled surface
52. First arm of the clip 50
53. Second arm of the clip 50
54. Piston of the clip 50
55. Connecting arm connecting the first and second arms 52 and 53
56. Actuator of the clip 50
57. Roller of the actuator 56
60. Second means of the valve 38 which acts as an actuator or clip
61. Elastic tag for returning the clip 60 to position
62. First arm of the clip 60
63. Second arm of the clip 60
64. Piston
65. Connecting arm
70. Second means of the valve which acts as an actuator
71. Actuating means or beveled surface
72. Flexible and preloaded tab
73. Closure/opening means or elastomer stud
74. Attachment pip
75. Piston-type actuator
76. Compressed air hose
77. Support
78. Beveled surface of the card 1
F1. Fluid flow when the means 9 is at rest and transfer is possible
F2. Fluid flow when the means 9 is deformed and transfer is impossible
F3. Depressing of the piston 14 of the second means 10
F4. Rocking of the lug 11 of the means 10 under the action F3
F5. Depression
F6. Depression opposite to F5
F7 and F8. Moving the two cards 1 closer together
F9. Sliding of the clip 40 to allow the valve 38 to open
F10. Sliding of the clip 40 to allow the valve 38 to close
F11. Fluid flow when the means 39 is at rest and transfer is possible
F12. Fluid flow when the means 39 is deformed and transfer is impossible
F13. Movement of the actuator 55
F14. Rocking of the first arm 52
F15. Pressure applied to the clip 60
F16. Movement of the actuator 75
F17. Rocking of the tab 72
F18 and F19. Movements of compressed air
P. Spacing between two adjacent clips 40, 50 and/or

What is claimed is:

1. A microfluidic card device for conducting a reaction, comprising:
    a microfluidic card body comprising an inside circulation network isolated from outside, said circulation network comprising at least a duct and chamber into which said duct opens;
    a microfluidic valve arrangement associated to said duct, to be operated by at least one external activation force independent from said card device to control passage of microfluid, said valve arrangement comprising:
    a microfluidic valve seat defined around the opening of said duct in said chamber,
    a flexible membrane closing at least said chamber;
    a stop means, distinct from the flexible membrane, located in said chamber, cooperating with said valve seat under the deformation of said membrane, between an open position wherein said stop means lie away from said valve seat, and a closed position wherein said stop means engages said valve seat, and
    an actuating means, arranged on said body but located out of said chamber, comprising a pressing member, cooperating with said membrane and said stop means, directly or indirectly movable by said external activation force between a non-pressing position wherein said stop means are in the open position, and a pressing position wherein said stop means are in the closed position, by deformation caused by said pressing member to said membrane.

2. A microfluidic card device according to claim 1, further comprising:
    a locking means for said pressing member, arranged on said body, but located out of said chamber, locking said pressing member in said pressing position, when said external application force is removed.

3. A microfluidic card device according to claim 1, wherein said actuating means are rockable between said non-pressing and said pressing position of said pressing member.

4. A microfluidic card device according to claim 2, wherein said actuating means incorporates biasing means towards the non-pressing position of pressing member.

5. A microfluidic card device according to claim 2, wherein said locking means is releasable.

6. A microfluidic card device according to claim 1, wherein the body has sides, an upper surface and a lower surface, the upper and lower surfaces being connected by the sides, and the membrane lies flat on said body, and closes the circulation network.

7. A microfluidic card device according to claim 1, wherein the external activation force includes manipulation of said actuating means by an operator.

8. A microfluidic card device according to claim 1, wherein the external activation force is mechanically driven.

9. A microfluidic card device according to claim 1, wherein said actuating means includes a clip that is movable in translation by said external activation force reversibly between two positions, a first position of rest in which said pressing member does not deform the membrane and urges the stop means in an engaging position with the valve seat, and a second position in which said pressing member is in the pressing position.

10. A microfluidic card device according to claim 1, wherein said actuating means comprises at least one flexible tab fixed on said card device, comprising said pressing member at a free end.

* * * * *